US 11,750,096 B2

(12) United States Patent
Chesneau

(10) Patent No.: US 11,750,096 B2
(45) Date of Patent: Sep. 5, 2023

(54) VOLTAGE CONVERTER AND METHOD

(71) Applicant: STMicroelectronics (Grenoble 2) SAS, Grenoble (FR)

(72) Inventor: David Chesneau, Grenoble (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 36 days.

(21) Appl. No.: 17/388,553

(22) Filed: Jul. 29, 2021

(65) Prior Publication Data

US 2022/0038004 A1 Feb. 3, 2022

(30) Foreign Application Priority Data

Jul. 30, 2020 (FR) ...................................... 2008096

(51) Int. Cl.
*H02M 3/158* (2006.01)
(52) U.S. Cl.
CPC .................................. *H02M 3/158* (2013.01)
(58) Field of Classification Search
CPC ... H02M 3/158; H02M 1/0009; H02M 1/0025
See application file for complete search history.

(56) References Cited

U.S. PATENT DOCUMENTS

| 5,652,772 A | 7/1997 | Isaksson et al. |
| 5,732,113 A | 3/1998 | Schmidl et al. |
| 5,987,063 A | 11/1999 | Rinne |
| 6,295,217 B1 | 9/2001 | Yang et al. |
| 6,295,326 B1 | 9/2001 | Tonissen et al. |
| 6,320,915 B1 | 11/2001 | Stott et al. |
| 6,359,938 B1 | 3/2002 | Keevill et al. |
| 6,363,128 B1 | 3/2002 | Isaksson et al. |
| 6,658,063 B1 | 12/2003 | Mizoguchi et al. |
| 6,731,594 B1 | 5/2004 | Bohnke |
| 7,039,000 B2 | 5/2006 | You et al. |
| 7,586,294 B2 | 9/2009 | Endo |
| 7,863,875 B1 | 1/2011 | Guo et al. |
| 7,872,456 B2 | 1/2011 | Li et al. |
| 8,199,537 B2 * | 6/2012 | Yan .................. H02M 3/33523 363/21.17 |
| 9,077,242 B2 | 7/2015 | Causse et al. |
| 9,112,425 B2 | 8/2015 | Prescott et al. |

(Continued)

FOREIGN PATENT DOCUMENTS

| EP | 2819288 A1 | 12/2014 |
| EP | 3468022 A1 | 4/2019 |
| KR | 20100102824 A | 9/2010 |

*Primary Examiner* — Adolf D Berhane
*Assistant Examiner* — Afework S Demisse
(74) *Attorney, Agent, or Firm* — Slater Matsil, LLP

(57) ABSTRACT

An embodiment voltage converter includes a first transistor connected between a first node of the converter and a second node configured to receive a power supply voltage, a second transistor connected between the first node and a third node configured to receive a reference potential, a first circuit configured to control the first and second transistors, and a comparator configured to compare a first voltage with a threshold, the first voltage being equal, during a first period, to a first increasing ramp and, during a second period, to a second decreasing ramp, the threshold having a first value during the first period and a second value during the second period, the first and second values being variable.

26 Claims, 7 Drawing Sheets

(56) References Cited

U.S. PATENT DOCUMENTS

| | | | |
|---|---|---|---|
| 9,325,233 B2 | 4/2016 | Bennett et al. | |
| 9,467,051 B2 | 10/2016 | Stoichita et al. | |
| 9,577,527 B2 | 2/2017 | Trichy et al. | |
| 9,621,036 B2 | 4/2017 | Wibben | |
| 9,722,490 B2 | 8/2017 | Archibald | |
| 9,991,798 B2 | 6/2018 | Lu | |
| 10,944,324 B2 | 3/2021 | Chesneau | |
| 2002/0057082 A1 | 5/2002 | Hwang | |
| 2002/0159533 A1 | 10/2002 | Crawford | |
| 2002/0181509 A1 | 12/2002 | Mody et al. | |
| 2003/0123582 A1 | 7/2003 | Kim et al. | |
| 2004/0001563 A1 | 1/2004 | Scarpa | |
| 2004/0005018 A1 | 1/2004 | Zhu et al. | |
| 2004/0190438 A1 | 9/2004 | Maltsev et al. | |
| 2005/0018458 A1 | 1/2005 | Shimada et al. | |
| 2006/0001410 A1 | 1/2006 | Ishikawa et al. | |
| 2006/0113980 A1 | 6/2006 | Yoshida | |
| 2006/0192536 A1 | 8/2006 | Chen et al. | |
| 2007/0024261 A1 | 2/2007 | Wong et al. | |
| 2007/0057658 A1 | 3/2007 | Hasegawa | |
| 2007/0069703 A1 | 3/2007 | Kokubun et al. | |
| 2007/0090819 A1 | 4/2007 | Hasegawa et al. | |
| 2008/0298106 A1 | 12/2008 | Tateishi | |
| 2008/0315851 A1 | 12/2008 | Akiyama et al. | |
| 2009/0079405 A1* | 3/2009 | Brokaw | H02M 1/08 323/288 |
| 2009/0160412 A1 | 6/2009 | Latham et al. | |
| 2010/0033153 A1 | 2/2010 | Xing et al. | |
| 2010/0072964 A1 | 3/2010 | Qiu et al. | |
| 2010/0320991 A1 | 12/2010 | Yoshino | |
| 2010/0327836 A1* | 12/2010 | Li | H02M 3/1588 323/283 |
| 2011/0031948 A1 | 2/2011 | Chien et al. | |
| 2011/0316495 A1 | 12/2011 | De Nie | |
| 2012/0038331 A1 | 2/2012 | Wu et al. | |
| 2012/0049826 A1 | 3/2012 | Hsu et al. | |
| 2012/0161738 A1 | 6/2012 | Nakashima | |
| 2013/0106385 A1 | 5/2013 | Smith, Jr. et al. | |
| 2013/0207563 A1 | 8/2013 | Hamamoto et al. | |
| 2014/0191744 A1 | 7/2014 | Choi et al. | |
| 2015/0077080 A1 | 3/2015 | Chen | |
| 2016/0233768 A1 | 8/2016 | de Cremoux et al. | |
| 2016/0306371 A1 | 10/2016 | Svorc et al. | |
| 2018/0062513 A1* | 3/2018 | Arbetter | H02M 3/158 |
| 2019/0267897 A1 | 8/2019 | Hsieh | |
| 2020/0136508 A1 | 4/2020 | Bandyopadhyay et al. | |
| 2021/0126535 A1 | 4/2021 | Esch et al. | |
| 2021/0184580 A1 | 6/2021 | Chesneau | |
| 2022/0345040 A1 | 10/2022 | Couleur et al. | |

* cited by examiner

VOLTAGE CONVERTER AND METHOD

CROSS-REFERENCE TO RELATED APPLICATIONS

This application claims the benefit of French Patent Application No. 2008096, filed on Jul. 30, 2020, which application is hereby incorporated herein by reference.

TECHNICAL FIELD

The present disclosure generally concerns electronic circuits. It more particularly concerns DC/DC voltage converters, of switched-mode power supply type, which convert a DC power supply voltage into a DC output voltage, for example buck-type DC/DC voltage converters where the DC output voltage has a lower value than the DC power supply voltage.

BACKGROUND

In a switched-mode power converter, a direct current (DC) voltage for powering the converter is chopped by the switching of switches to implement phases of power storage in an assembly comprising an inductive element and a capacitive element, and phases of discharge into a load connected to the converter output, of the power stored in this assembly.

In a pulse frequency modulation (PFM)-type switched-mode converter, each operating cycle of the converter comprises a phase of power storage in the assembly, followed by a phase of power delivery to the load connected to the converter. During the power storage phase, the current flowing through the inductive element increases. During the power delivery phase, the current flowing through the inductive element decreases. For each operating cycle, it is desirable for the current flowing through the inductive element to be null at the beginning of the power storage phase and at the end of the power delivery phase.

Known switched-mode converters, particularly of PFM type, have various disadvantages.

SUMMARY

There is a need to overcome all or part of the disadvantages of known switched-mode converters, particularly of PFM type.

An embodiment overcomes all or part of the disadvantages of known switched-mode converters, particularly of PFM type.

An embodiment voltage converter comprises a first transistor connected between a first node of the converter and a second node configured to receive a power supply voltage, a second transistor connected between the first node and a third node configured to receive a reference potential, a first circuit configured to control the first and second transistors, and a comparator configured to compare a first voltage with a threshold, the first voltage being equal, during a first period, to a first increasing ramp and, during a second period, to a second decreasing ramp, and the threshold having a first value during the first period and a second value during the second period, the first and second values being variable.

An embodiment method of operation of a voltage converter comprising a first transistor connected between a first node of the converter and a second node configured to receive a power supply voltage, a second transistor connected between the first node and a third node configured to receive a reference potential, and a first circuit configured to control the first and second transistors, the method comprising, during each operating cycle, a first period during which a comparator compares a first voltage with a threshold, the first voltage being equal, during the first period, to a first increasing ramp, the threshold having, during the first period, a first value, and a second period during which a comparator compares the first voltage with the threshold, the first voltage being equal, during the second period, to a second decreasing ramp, the threshold having, during the second period, a second value, the first and second values of the threshold being variable.

According to an embodiment, the converter comprises a second circuit configured to generate the threshold.

According to an embodiment, the converter comprises a third circuit configured to compare the current in the first node with value zero, the second circuit being configured to modify the value of the threshold during an operating cycle if the current in the first node at the end of the previous cycle is different from zero.

According to an embodiment, the first value of the threshold is equal to a reference voltage plus a third value, and the second value of the threshold is equal to the reference value minus the third value, the third value being variable.

According to an embodiment, the third value varies between a number of predetermined values.

According to an embodiment, the predetermined values of the third value are successively separated by a same fourth constant value.

According to an embodiment, the converter comprises a fourth circuit configured to determine whether the power supply voltage is within a range from the value of the voltage on the first node minus 200 mV to the value of the voltage on the first node plus 200 mV, the second circuit being configured, in the case where the power supply voltage is within this range during a cycle, to keep the first and second values of the threshold for the next cycle or so that the first and second values of the threshold have, during the next cycle, a predetermined value.

According to an embodiment, the converter comprises a fifth circuit configured to determine whether the value of the current in the first node is smaller or greater than zero.

According to an embodiment, the converter comprises a sixth circuit configured to determine whether the slope of the current in the first node during the first period of a cycle is greater or smaller than the slope during the second period of a cycle.

According to an embodiment, the second circuit is configured to vary the first and second values of the threshold so that:

a) if the slope of the current in the first node during the first period is greater than the slope of the current in the first node during the second period and if the current in the first node is smaller than zero, the distance between the first and second values of the threshold is decreased;

b) if the slope of the current in the first node during the first period is greater than the slope of the current in the first node during the second period and if the current in the first node is greater than zero, the distance between the first and second values of the threshold is increased;

c) if the slope of the current in the first node during the first period is smaller than the slope of the current in the first node during the second period and if the current in the first node is smaller than zero, the distance between the first and second values of the threshold is increased; and d) if the slope of the current in the first node during the first period is smaller than the slope of the current in the first node during the second period and if the current in the first node is greater than zero, the distance between the first and second values of the threshold is decreased.

According to an embodiment, in cases a) and d), the third value is increased and in cases b) and c), the third value is decreased.

According to an embodiment, the third circuit, configured to compare the current in the first node with zero, comprises an input coupled to the first node and an input coupled to the node of application of the control voltage of the second transistor.

According to an embodiment, the third circuit is coupled to the node of application of the control voltage by a circuit applying a delay to the control signal.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the following description, when reference is made to the voltage of a node, it is considered that it is, unless otherwise indicated, the voltage between the node and a reference potential, typically the ground.

Figure 1:
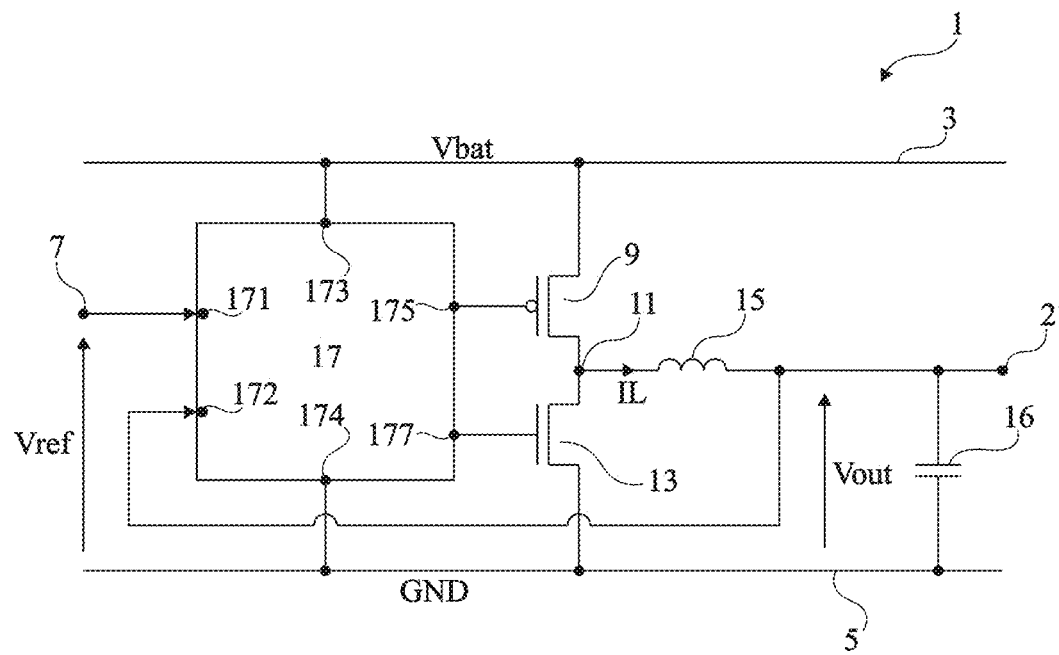
FIG. 1 schematically shows an embodiment of a DC/DC voltage converter.

FIG. 1 schematically shows an example of a voltage converter 1 of the type to which the described embodiments apply. In this example, converter 1 is a DC/DC converter, which converts a DC power supply voltage into a DC output voltage.

Converter 1 is configured to deliver a DC output voltage Vout. The converter comprises an output node 2, where voltage Vout is available.

Converter 1 is powered with a DC power supply voltage Vbat. Converter 1 is then connected between a first conductive rail or node 3 set to voltage Vbat and a second conductive rail or node 5 set to reference potential GND.

Converter 1 is configured to deliver voltage Vout at a value equal to a set point value. For this purpose, converter 1 receives, on an input node 7, a DC set point voltage Vref referenced to potential GND, having a value representative of the set point value of voltage Vout, preferably equal to the set point value of voltage Vout.

In this example, voltages Vout, Vbat, and Vref are positive.

In this example, converter 1 is of buck type, that is, the set point value of voltage Vout is smaller than the value of voltage Vbat. In other words, the value of voltage Vout is smaller than that of voltage Vbat.

Converter 1 comprises a first MOS ("metal oxide semiconductor") transistor 9, preferably a PMOS transistor (P-channel MOS transistor). As a variant, transistor 9 may also be an NMOS transistor associated with a "bootstrap" system. MOS transistor 9 is connected between rail 3 and an internal node 11. In other words, a first conduction terminal of transistor 9, for example, its source, is connected to rail 3, a second conduction terminal of transistor 9, for example its drain, being connected to node 11.

Converter 1 further comprises a second MOS transistor 13, preferably an NMOS transistor (N-channel MOS transistor). Transistor 13 is connected between node 11 and rail 5. In other words, a first conduction terminal of transistor 13, for example, its source, is connected to rail 5, a second conduction terminal of transistor 13, for example, its drain, being connected to node 11. As a variant, the NMOS transistor may be replaced with a diode or a Schottky diode.

Thus, transistors 9 and 13 are series-connected between rails 3 and 5 and are connected to each other at the level of inner node 11.

Converter 1 comprises an inductive element or inductance 15. Inductance 15 is connected between node 11 and node 2.

Converter 1 comprises a control circuit 17. Circuit 17 is configured to implement, or control, the operating cycles of converter 1, to regulate voltage Vout so that its value is equal to set point value Vref.

For this purpose, circuit 17 comprises:
a terminal 171 coupled, preferably connected, to node 7;
a terminal 172 coupled, preferably connected, to node 2;
a terminal 173 coupled, preferably connected, to rail 3;
a terminal 174 coupled, preferably connected, to rail 5;
a terminal 175 coupled, preferably connected, to a control terminal, or gate, of transistor 9; and
a terminal 177 coupled, preferably connected, to a control terminal, or gate, of transistor 13.

Converter 1 comprises an output capacitor 16 connected between node 2 and rail 5. As an example, the capacitance is in the order of from 2.2 µF to 20 µF, or even more. Such an output capacitor plays the role of a filter. In other words, the converter output capacitor enables to smooth the current present on node 2 and to store power supplied to node 2 by the converter.

In operation, a load is connected between node 2 and rail 5 to be powered with voltage Vout. The load for example comprises an input capacitor between node 2 and rail 5.

In this example, converter 1 is configured to operate in pulse frequency modulation (discontinuous conduction mode). Circuit 17 is then configured to start an operating cycle of converter 1 when the value of voltage Vout is smaller than set point value Vref and the two transistors 9 and 13 are in the off state. More particularly, at the beginning of each operating cycle, circuit 17 is configured to cause the setting to the on state of transistor 9, transistor 13 being left in the off state. Power is then stored in inductance 15 and in capacitor 16, during a first time period TPon, for example constant for each operating cycle when transistor 9 is maintained in the on state by circuit 17, a current IL then flowing through inductance 15. At the end of time period TPon, circuit 17 is configured to cause the setting to the off state of transistor 9 and the setting to the on state of transistor 13. Power is then delivered back by inductance 15 and capacitor 16 to the load connected at the converter output, for a second time period TNon, for example constant for each operating cycle when transistor 13 is maintained in the on state by circuit 17, the current IL in the inductance decreasing. At the end of time period TNon, circuit 17 is configured to cause the setting to the off state of transistor 13.

Time period TNon is determined so that the time when circuit 17 causes the setting to the off state of transistor 13 corresponds to the time when the current IL flowing through inductance 15 becomes null. However, in practice, as will be described in further detail in the rest of the disclosure, this is not always true, which raises an issue.

Figure 2:
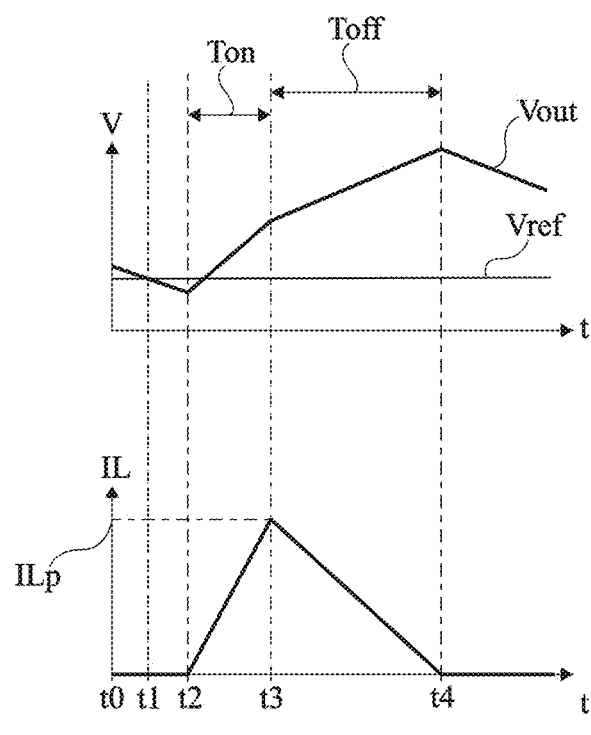
FIG. 2 shows timing diagrams illustrating an example of operation of the converter of FIG. 1.

FIG. 2 shows timing diagrams illustrating an example of desired operation of the converter 1 of FIG. 1.

The timing diagram at the top of FIG. 2 illustrates the variation over time t of voltage Vout, in volts V, the timing diagram at the bottom of FIG. 2 illustrating the corresponding variation, over time t, of the current IL flowing through inductance 15.

At a time t0, transistors 9 and 13 are in the off state, current IL is null, and the value of voltage Vout is greater than its set point value, in the present example the value of voltage Vref.

Between time t0 and a subsequent time t2, voltage Vout decreases, for example due to the fact that the load connected to converter 1 consumes current and discharges the output capacitor.

At a time t1 between times t0 and t2, voltage Vout becomes smaller than its set point value Vref. This is detected by the circuit 17 of converter 1, which then causes the setting to the on state of transistor 9. Transistor 9 turns on at time t2.

Thus, from time t2, inductance 15 has a terminal connected to node 2 and a terminal coupled to rail 3, via transistor 9. The current IL flowing through inductance 15 increases.

As a result, from time t2, current IL is delivered to node 2, and the capacitor 16 between node 2 and rail 5 charges. Voltage Vout increases and becomes greater than its set point value Vref.

At a next time t3, equal to t2+TPon, circuit 17 causes the setting to the on state of transistor 13 and the setting to the off state of transistor 9. At time t3, the current in the inductance has a maximum value ILp.

Thus, from time t3, inductance 15 has a terminal connected to node 2 and a terminal coupled to rail 5, via transistor 13. The current IL flowing through inductance 15 decreases.

Although current IL decreases from time t3, the capacitor between node 2 and rail 5 keeps on charging and voltage Vout keeps on increasing if the current drawn by the load is smaller than the current IL supplied to node 2.

At a next time t4, equal to t3+TNon, circuit 17 causes the setting to the off state of transistor 13. It is here considered that converter 1 operates as it should, and current IL is then null at time t4. However, in practice, this is not always true.

From time t4, current IL is null and voltage Vout decreases, similarly to what would happen at time t0.

Although this is not shown herein, when the value of potential Vout falls back below its set point value Vref at a time subsequent to time t4, circuit 17 implements a new operating cycle such as described in relation with successive times t2, t3, and t4.

Figure 3:
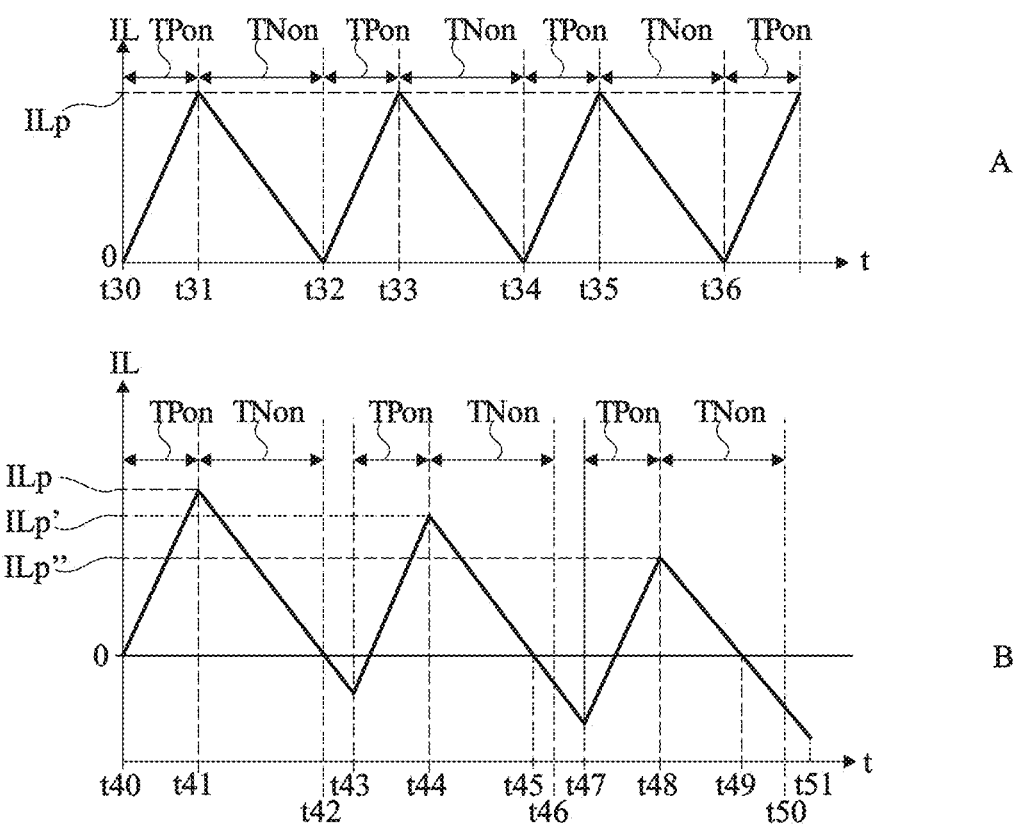
FIG. 3 shows other timing diagrams illustrating the desired or theoretical operation and the real or practical operation of the converter of FIG. 1.

FIG. 3 shows other timing diagrams illustrating the operation of the converter 1 of FIG. 1. More particularly, a timing diagram A (at the top of FIG. 3) shows an ideal or theoretical example of the variation of current IL and a timing diagram B (at the bottom of FIG. 3) shows an example of the real variation of current IL. The two timing diagrams A and B illustrate an example of operation where, for a plurality of successive operating cycles, voltage Vout is smaller than voltage Vref at the end of each operating cycle of converter 1.

At a time t30, although this is not illustrated in FIG. 3, voltage Vout is smaller than voltage Vref. An operating cycle starts with the switching to the on state of transistor 9. As a result, current IL increases until a next time t31 equal to t30+TPon.

At time t31, current IL reaches its maximum value ILp. Further, transistor 9 and 13 are respectively switched to the off state and to the on state. As a result, the current decreases until a next time t32 equal to t31+TNon.

In this example of ideal operation, transistor 13 is switched to the off state at time t32, and current IL becomes null at time t32.

At a time t32, voltage Vout being smaller than voltage Vref, transistor 9 is switched to the on state, which marks the beginning of a new operating cycle. Current IL then increases until a next time t33 equal to t32+TPon.

At time t33, current IL reaches value ILp. Further, transistor 9 and 13 are respectively switched to the off state and to the on state. As a result, the current decreases until a next time t34 equal to t33+TNon.

In this example of ideal operation, transistor 13 is switched to the off state at time t34, and current IL becomes null at time t34.

At a time t34, voltage Vout being smaller to voltage Vref, transistor 13 is switched to the on state, which marks the beginning of a new operating cycle. Current IL increases until a next time t35 equal to t34+TPon.

At time t35, current IL reaches value ILp. Further, transistor 9 and 13 are respectively switched to the off state and to the on state. As a result, the current decreases until a next time t36 equal to t35+TNon.

In this example of ideal operation, transistor 13 is switched to the off state at time t36 and current IL becomes null at time t36.

At time t36, voltage Vout being smaller than voltage Vref, a new operating cycle starts.

In the example of theoretical operation illustrated by timing diagram A, at the end of each operating cycle, the switching of transistor 13 to the off state occurs at the time when current IL becomes null. Thus, when an operating cycle is immediately followed by a new operating cycle, in this new operating cycle, current IL increases from a null value.

Timing diagram B illustrates a corresponding example of real operation of converter 1. In this example of real operation, the practically case where transistor 13 is not immediately switched to the off state at the end of the time period TNon which has elapsed from its last switching to the on state is considered.

At a time t40, voltage Vout being smaller than voltage Vref, an operating cycle starts with the switching to the on state of transistor 9. As a result, current IL increases until a next time t41 equal to t40+TPon.

At time t41, current IL reaches its maximum value ILp. Further, transistor 9 and 13 are respectively switched to the off state and to the on state. As a result, the current decreases until a next time t42 equal to t41+TNon. The current becomes null at time t42. However, the switching of transistor 13 to the off state is only effective at a time t43 subsequent to time t42. Thus, between times t42 and t43, current IL is negative and decreases. In other words, the current flows through inductance 15 from node 11 to node 2 before time t42, becomes null at time t42, and flows through inductance 15, from node 2 to node 11 after time t42.

At a time t43, voltage Vout being smaller than voltage Vref, transistor 9 is switched to the on state at time t43, which marks the beginning of a new operating cycle. Current IL then increases until a next time t44 equal to t43+TPon.

At time t44, current IL reaches a value ILp', smaller than maximum value ILp due to the fact that time period TPon is constant at each cycle. Further, transistor 9 and 13 are respectively switched to the off state and to the on state. As a result, current IL decreases until a next time t46 equal to t44+TNon, current IL becoming null at a time t45 between times t44 and t46. Further, the switching of transistor 13 to the off state is only effective at a time t47 subsequent to time t46. Thus, between times t45 and t47, current IL is negative and decreases to a value lower (or higher in absolute value) than that reached at time t43.

At time t47, voltage Vout being smaller than voltage Vref, transistor 9 is switched to the on state at time t47, which marks the beginning of a new operating cycle. Current IL then increases until a next time t48 equal to t47+TPon.

At time t48, current IL reaches a value ILp", smaller than value ILp'. Further, transistor 9 and 13 are respectively switched to the off state and to the on state. As a result, current IL decreases until a next time t50 equal to t48+TNon, current IL becoming null at a time t49 between times t48 and t50. Further, the switching of transistor 13 to the off state is only effective at a time t51 subsequent to time t50. Thus, between times t49 and t51, current IL is negative and decreases to a value lower (or higher in absolute value) than that reached at time t47.

Due to the fact that at each operating cycle illustrated by timing diagram B, the maximum value reached by current IL (times t41, t44, and t48) is lower and lower, converter 1 does not supply enough power to node 2 to regulate voltage Vout at its value Vref, voltage Vout being for example lower and lower, which raises an issue. Further, at each operating cycle illustrated by timing diagram B, the negative value reached by current IL (times t43, t47, and t51) is lower and lower (or higher and higher in absolute value), whereby converter 1 samples more and more power from node 2, which is not desirable. Indeed, the value of the current supplied to the load, and in particular the value of the current peak, decreases from one cycle to the other, which has a negative impact on the load power supply. Further, although, theoretically, the maximum value of current IL might infinitely decrease, in practice, transistor 13 may in certain cases be destroyed or damaged before this by negative values of current IL that transistor 13 is not capable of conducting between its conduction terminals.

A practical example of operation where the switching to the off state of transistor 13 occurs after the time when current IL becomes zero has been described in relation with the timing diagram B of FIG. 3.

In another practical example of operation, not illustrated, at each operating cycle of a plurality of successive cycles implemented immediately one after the others, transistor 13 is switched to the off state while current IL is not null and is still positive. In this case, at each of the operating cycles, current IL increases from a higher and higher value, whereby current IL reaches a higher and higher maximum value, and the operating cycle ends with a higher and higher positive non-zero value of current IL. This operation is less disturbing than that described in relation with timing diagram B since, after a plurality of operating cycles, voltage Vout will have recovered its set point value Vref. Thus, the next operating cycle will not be immediately implemented, which will leave time for current IL to become null.

Both cases, that is, the case described in relation with the timing diagram B of FIG. 3 and the other practical case described hereinabove, are generally at least partly caused by operating times of components, for example response or propagation times of comparators.

Figure 4:
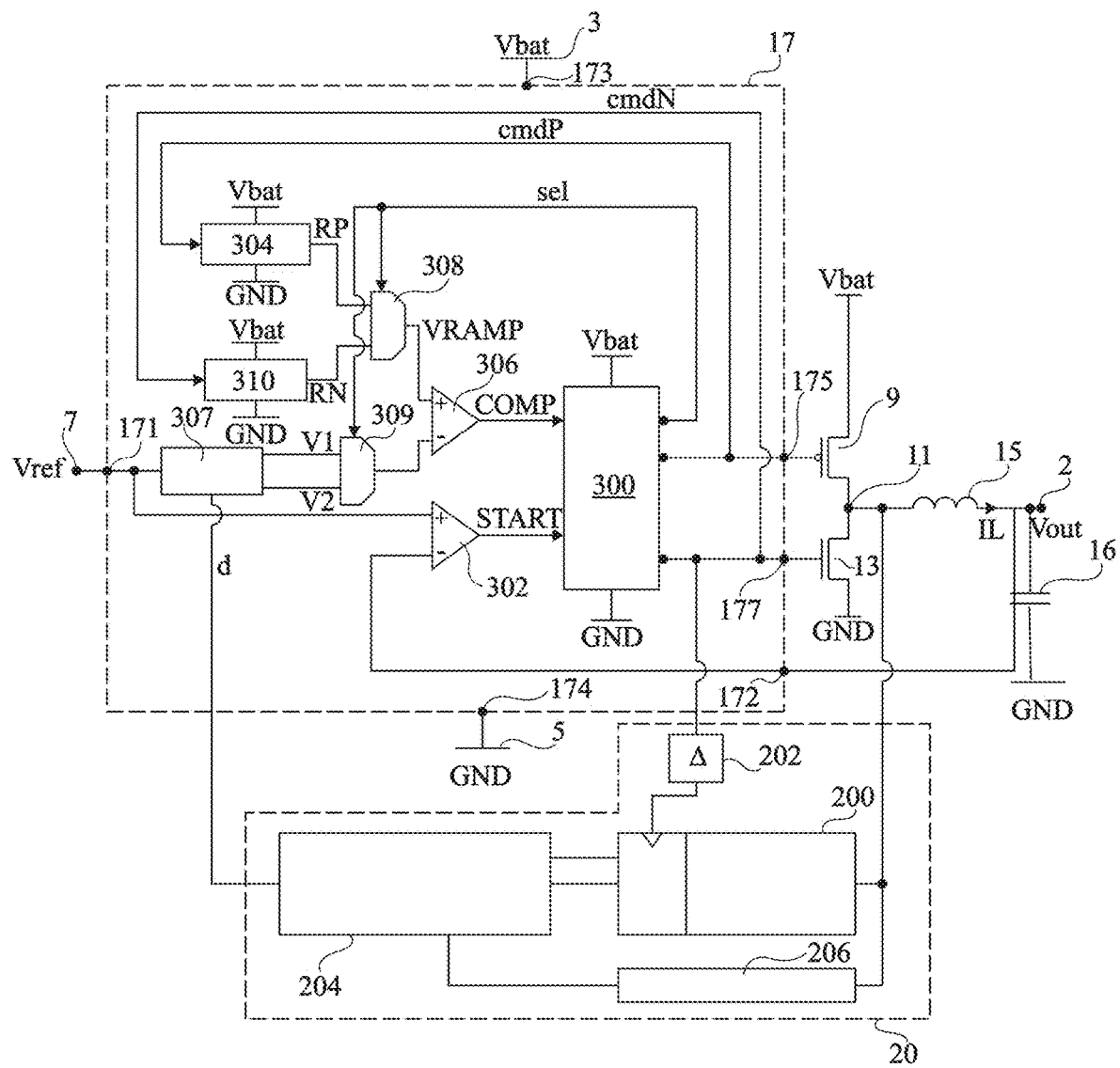
FIG. 4 shows an embodiment of a DC/DC voltage converter.

FIG. 4 shows an embodiment of a DC/DC voltage converter. The converter of FIG. 4 comprises the elements described in relation with FIG. 1, circuit 17 being more detailed.

Circuit 17 comprises a circuit 300, for example, a state machine. State machine 300 is configured to supply the signals for controlling transistors 9 and 13 to respective terminals 175 and 177 to implement the operation described in relation with FIGS. 5 to 8 described hereafter. To determine the control signals of transistors 9 and 13, state machine 300 receives a plurality of signals. Circuit 300 is powered with voltage Vbat and is connected between rails 3 and 5.

Circuit 17 comprises a comparator 302 configured to deliver, on its output, a signal START representative of the comparison of the value of voltage Vout with its set point value. The output of comparator 302 is coupled, for example, connected, to circuit 300. Signal START is in a first state, for example, a high state, when the value of voltage Vout is smaller than its set point value, and in a second state, for example, a low state, when the value of voltage Vout is greater than its set point value. Comparator 302 comprises a first input, for example, inverting (−), configured to receive a voltage having a value representative of the value of voltage Vout and a second input, for example, non-inverting (+) configured to receive a voltage having a value representative of the set point value of voltage Vout.

In this example where the value of voltage Vref is equal to the set point value of voltage Vout, comparator 302 is configured to compare voltage Vref with voltage Vout, the first input of comparator 302 being connected to node 2, and the second input of comparator 302 being connected to terminal 171 of circuit 17.

In this embodiment, duration TPon is determined by comparing a voltage ramp RP with a reference voltage V1. Thus, circuit 17 comprises a ramp generator 304 configured to deliver potential ramp RP and a comparator 306 configured to compare ramp RP with voltage V1, and a circuit 307 configured to generate voltage V1. Voltage RP is referenced to reference voltage GND.

Generator 304 is powered with potential Vbat and is connected between rails 3 and 5, which connections are not shown in FIG. 4 to avoid overloading the drawing.

Generator 304 is controlled by circuit 300, via a signal cmdP. More particularly, when signal START is in its first state, circuit 300 causes the setting to the on state of transistor 9 and, at the same time, the starting of a voltage ramp RP via signal cmdP. As an example, signal cmdP is determined from the control signal supplied by circuit 300 to transistor 9, or even is identical to the control signal supplied by circuit 300 to transistor 9.

Each voltage ramp RP is for example a ramp increasing from reference potential GND.

Ramp RP is transmitted to a first input, for example, non-inverting (+), of comparator 306. The second input, for example, inverting (−), of comparator 306 receives voltage V1, and is coupled, preferably connected, to the output of generator 307. The output of comparator 306 delivers a signal COMP to circuit 300.

In FIG. 4, voltage ramp RP is transmitted to comparator 306 via a selection circuit 308, or multiplexer, comprising two inputs, one output, and one control terminal. The control terminal of circuit 308 receives from circuit 300 a signal sel. According to the state of signal sel, circuit 308 transmits on its output the signal present on one or the other of its inputs. An output signal VRAMP of circuit 308 thus follows the variations of the signal present on one or the other of the inputs of circuit 308.

More particularly, at the time when circuit 300 causes the setting of transistor 9 to the on state and the beginning of a voltage ramp RP, circuit 300 places signal sel in a first state such that comparator 306 receives voltage ramp RP.

Thus, as long as signal sel is maintained in its first state, signal COMP is in a first state, for example, the low state, as long as voltage RP is smaller than voltage V1. Signal COMP switches to a second state, for example, the high state, as soon as voltage RP becomes greater than voltage V1.

The switching of signal COMP from its first state to its second state marks the end of time period TPon. Circuit 300 then controls transistor 9 to the off state and transistor 13 to the on state. Preferably, circuit 300 simultaneously causes the end of voltage ramp RP, via signal cmdP.

Duration TNon is for example determined by comparing a voltage ramp RN with a voltage V2 generated by circuit 307. Thus, circuit 17 comprises a ramp generator 310 configured to deliver voltage ramp RN.

Generator 310 is powered with potential Vbat and is connected between rails 3 and 5, which connections are not shown in FIG. 4 to avoid overloading the drawing. Generator 310 is controlled by circuit 300, via a signal cmdN.

Voltages V1 and V2 are generated by circuit 307 from voltage Vref. Voltages V1 and V2 are preferably different. Thus, circuit 307 receives as an input voltage Vref and outputs voltages V1 and V2. Voltage V2 is greater than voltage V1 and than voltage Vref. Voltage V1 is smaller than voltage V2 and than voltage Vref. For example, voltages V1 and V2 are respectively substantially equal to Vref−DV and to Vref+DV, DV being a variable.

Circuit 307 comprises, in the example of FIG. 4, two outputs coupled, preferably connected, to two inputs of a selection circuit 309. Selection circuit 309 comprises an output coupled, preferably connected, to one of the inputs, here, the inverting input (−), of comparator 306. Selection circuit 309 further comprises a control input, receiving a control signal. When the control signal takes a first value, comparator 306 receives voltage V1 and when the control signal takes a second value, comparator 306 receives voltage V2. In the example of FIG. 4, the selection circuit receives control signal sel, that is, the same control signal as selection circuit 308.

At the end of duration TPon, when circuit 300 causes the setting to the off state of transistor 9 and the setting to the on state of transistor 13, circuit 300 also causes the starting of a voltage ramp RN via signal cmdN. As an example, signal cmdN is determined from the control signal delivered by circuit 300 to transistor 13, or even is identical to the control signal delivered by circuit 300 to transistor 13.

Each voltage ramp RN is for example a voltage ramp decreasing from power supply voltage Vbat. Ramps RN and RP have slopes of opposite signs. Thus, one, here slope RP, is increasing and the other, here slope RN, is decreasing. Slope RP, that is, the increasing slope, is compared with voltage V1 and the decreasing slope is compared with voltage V2, greater than voltage V1. Ramps RP and RN have, in absolute value, equal slopes.

The comparison of ramp RN with voltage V2 is implemented by comparator 306. Ramp RN is then transmitted to the second input of circuit 308. Further, circuit 300 is configured to switch signal sel to its second state, at the same time as it causes the setting to the off state of transistor 9 and the setting to the on state of transistor 13, so that ramp RN is transmitted to comparator 306.

Thus, in cases where each ramp RN is decreasing from voltage Vbat, as long as signal sel is maintained in its second state, signal COMP is in its second state, for example, the high state, as long as voltage RN is greater than voltage V2, and switches to its first state, for example, the low state, as long as voltage RN becomes smaller than voltage V2.

The switching of signal COMP from its second state to its first state marks the end of time period TNon. Circuit 300 then causes the setting to the off state of transistor 13. Preferably, circuit 300 simultaneously causes the end of voltage ramp RN, via signal cmdN.

In an alternative embodiment, not shown, the comparison of voltage ramp RP with voltage V1 is implemented by comparator 306, and the comparison of voltage ramp RN with voltage V2 is implemented by means of an additional comparator provided in circuit 17. The additional comparator then receives on a first input, for example, non-inverting (+), voltage ramp RN, and on a second input, for example, inverting (−), voltage V2, the output of the additional comparator delivering, to circuit 300, a signal representative of the comparison of potential ramp RN with voltage V2. In this variation, circuits 308 and 309 are omitted and circuit 300 does not generate signal sel. It will be within the abilities of those skilled in the art to adapt the above description of the converter of FIG. 4 to this alternative embodiment.

In another variant, not shown, ramp RP is a voltage ramp decreasing from voltage Vbat and/or voltage ramp RN is a voltage ramp increasing from voltage GND. It will be within the abilities of those skilled in the art to adapt the converter of FIG. 4 to this case.

The inventors have determined that the problem of timing diagram B, that is, the fact for current IL to have, at the end of a cycle, a value different from zero, is mainly caused, in the case of FIG. 4, by the delay caused by comparator(s) 306. The value TCOMP of this delay is known and preferably substantially constant.

The embodiment of FIG. 4 uses a correction loop where the values of the voltages, or thresholds, V1 and V2 are adjusted at each cycle when current IL is different from zero. Preferably, thresholds V1 and V2 are only modified once per cycle. Voltages V1 and V2 are adjusted so that current IL at the end of the cycle converges towards value zero, from one cycle to the other. More particularly, thresholds V1 and V2 are adjusted to reach values enabling to obtain, at the end of a cycle, a current substantially equal to 0.

To adjust voltages V1 and V2, circuit 307 receives a control signal d, generated by a circuit, or assembly of circuits, 20. The reception of signal d causes the switching of variable DV, and thus the value of voltages V1 and V2.

According to an embodiment, variable DV may take a predetermined number of values, preferably a fixed number of values. Circuit 307 is thus configured to supply voltages V1 and V2 from a variable DV among a predetermined number of values. For example, variable DV may take a value among 32 values, for example, 32 values different from zero. For example, the different values of variable DV are successive values, successive values being separated by the same constant, for example, equal to 16 mV.

Figure 5:
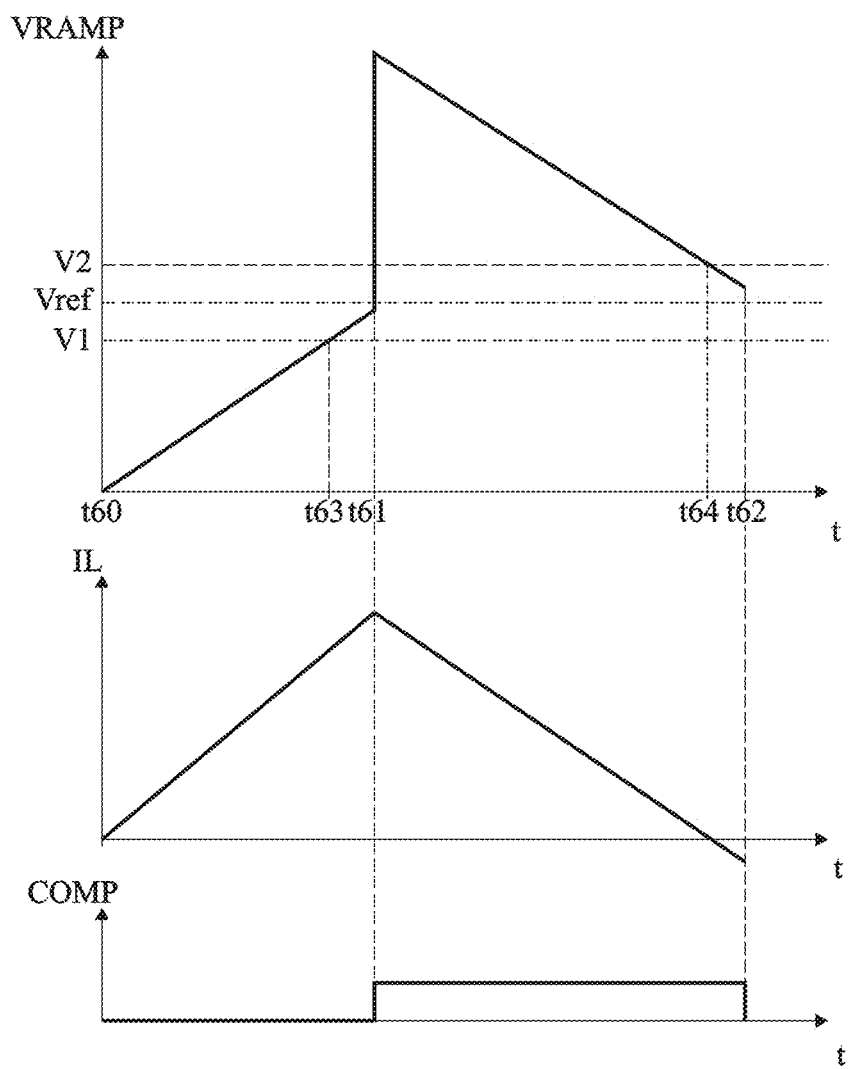
FIG. 5 shows timing diagrams illustrating the operation of the converter of FIG. 4.

FIG. 5 shows timing diagrams illustrating an operating cycle of the converter. FIG. 5 shows output voltage VRAMP of comparator 308, current IL, and output signal COMP of comparator 306.

An operating cycle of the converter comprises a single ramp RP, generated by generator 304, and a single ramp RN, generated by generator 310. More particularly, between a time t60 and a time t61, voltage VRAMP takes the values of ramp RP, which corresponds to the magnetization step, and between time t61 and a time t62, voltage VRAMP takes the values of ramp RN, which corresponds to the demagnetization step. An operating cycle of the converter thus corresponds to the time period between time t60 and time t62.

At time t60, voltage VRAMP increases from a value preferably equal to 0, following the variations of ramp RP. At time t60, voltage VRAMP is thus smaller than value Vref and than thresholds V1. and V2. In particular, voltage VRAMP is smaller than the threshold delivered at the output of circuit 309, that is, threshold V1. Signal COMP thus has a first value, for example, a low value corresponding to binary value 0 in the case of FIG. 5.

At a time t63 located between time t60 and time t61, voltage VRAMP reaches threshold V1. Output signal COMP of comparator 306 takes, at time t61, after the response time TCOMP of the comparator, a second value, for example, a high value corresponding to binary value 1, representative of the fact that voltage VRAMP is greater than threshold V1. Time t61 occurs after duration TCOMP from time t63, that is, time t61 is equal to t63+TCOMP. Thus, between times t63 and t61, voltage VRAMP still follows the variations of ramp RP and keeps on increasing, beyond value Vref.

Between times t60 and t61, multiplexer 308 (mux1) outputs the signal RP generated by generator 304. The control signal sel of multiplexer 308, generated by circuit 300, takes the value ordering the multiplexer to output the signal originating from generator 304. This value of signal sel also corresponds to the value ordering circuit 309 to output threshold V1.

At time t61, voltage VRAMP becomes equal to ramp RN, for example, by modifying the value of the control signal sel of multiplexer 308. Voltage VRAMP thus takes a high value, higher than value Vref and than threshold V2, for example, value Vbat, and decreases following the variations of ramp RN. Voltage VRAMP thus still has a value greater than value Vref. Further, at time t61, the output of circuit 309 delivers threshold V2.

At a time t64, voltage VRAMP reaches value V2. Output signal COMP of comparator 306 takes the first value representative of the fact that voltage VRAMP is smaller than the output value of circuit 309, here, threshold V2, at time t62, after response time TCOMP. Time t62 occurs after duration TCOMP from time t64, that is, time t62 is equal to t64+TCOMP. Thus, between times t64 and t62, voltage VRAMP still follows the variations of ramp RN and keeps on increasing, beyond value Vref.

Between times t61 and t62, multiplexer 308 (mux1) outputs the signal RN generated by generator 310. The control signal sel of multiplexer 308, generated by circuit 300, takes the value ordering the multiplexer to output the signal originating from generator 310. This value of signal sel also corresponds to the value ordering circuit 309 to output threshold V2.

Between times t60 and t61, transistor 9 is on and transistor 13 is off, which causes an increase in current IL, preferably from a current substantially equal to zero. Between times t61 and t62, transistor 9 is off and transistor 13 is off, which causes a decrease in current IL from a value of the current peak, obtained at the end of the magnetization step. As described in relation with FIG. 3, the ideal current value IL at the end of the cycle is zero. In the example of FIG. 5, the value of current IL at the end of the cycle is different from zero. More particularly, the value of the current at time t62 is smaller than zero. This means that current IL has not increased for a sufficiently long time during the magnetization, in other words, that threshold V1 is too low and/or that current IL has decreased for too long a time during the demagnetization, in other words, that threshold V2 is too low. Thresholds V1 and V2 are thus adjusted at the next cycle.

Referring again to FIG. 4, circuit 20 comprises a circuit 200, configured to determine whether current IL is equal to zero at the end of each cycle. In other words, circuit 200 compares the value of current IL when the output of comparator 306 determines that voltage VRAMP has reached the value of threshold V2, with value zero. Preferably, circuit 200 determines whether the current is greater or smaller than zero. Circuit 200 for example comprises two outputs coupled, preferably connected, to a circuit 204 of circuit 20 configured to generate control signal d. The circuit for example comprises an output delivering the information that the current is greater than zero and an output delivering the information that the current is smaller than zero. If the current alternates between greater than zero and smaller than zero, the circuit determines that the current is sufficiently close to zero.

An example of implementation of circuit 200 is described in patent application EP2819288.

Circuit 200 comprises a first input receiving current IL. This first input is for example coupled, preferably connected, to node 11. Circuit 200 comprises a second input determining the time at which circuit 200 compares the value of current IL with value zero. The second input is preferably coupled to node 177, that is, the node receiving the control signal of transistor 13. Circuit 200 thus determines that the cycle is finished, and thus determines the time to compare current IL with value zero, when the control signal of transistor 13 orders transistor 13 to pass from an on state to an off state.

The second input of circuit 200 is preferably coupled to node 177 by a circuit 202 configured to delay the signal by a time period Δ. Duration Δ is determined to ensure that the value of current IL compared with value zero effectively corresponds to the value of the current at the end of the cycle. The value of duration Δ is thus at least equal, preferably substantially equal, to the time between the initial time when the control signal on node 177 causes the state change and the time when the current at the initial time is compared with value zero.

As a variant, circuit 200 may comprise a single output. The output of circuit 200 is then coupled, preferably connected, to a circuit 204 of circuit 20 configured to generate control signal d.

Circuit 200 delivers, from its output(s), one or a plurality of signals indicating whether current IL is substantially equal to zero or whether it is different from zero. Based on this signal, circuit 204 determines whether thresholds V1 and V2 should be adjusted. Preferably, circuit 200 outputs the information that the current is smaller than or greater than zero.

Circuit 204 supplies signal d to vary threshold V1 and V2 as described hereafter in relation with FIG. 5.

Circuit 20 preferably comprises a circuit 206 configured to compare voltage Vbat with twice voltage Vout. The result of this comparison corresponds to the result of the comparison between value Vbat−Vout and value Vout, in other words, to the result of the comparison between value (Vin−Vout)/L and Vout/L, L being the value of inductance L. In other words, circuit 206 is configured to compare the slope of current IL during the magnetization and during the demagnetization. Hereafter, when reference is made to the comparison of slopes, the comparison is made without taking the signs of the slopes into account. In other words, the comparison is made on the absolute values of the slopes. In the following description, the term slope refers to the value of the slope in absolute value.

Circuit 206 is coupled, preferably connected, to the input of node 11 delivering voltage Vout. Circuit 206 is further coupled, preferably connected, to the input of rail 3. The link between circuit 206 and rail 3 is not shown in FIG. 4. Circuit 206 is coupled, preferably connected, to the output of circuit 204.

If values Vbat and 2*Vout are sufficiently close, for example, equal to each other to within 200 mV, in other words voltage Vbat is in a range from 2*Vout−Vm to 2*Vout+Vm, Vm being for example equal to 200 mV, this means that the slopes of current IL during the magnetization and during the demagnetization are substantially the same, to within their sign. The modification of the thresholds would thus not enable to have current IL converge to zero at the end of the cycle. Thus, an output of circuit 206 is coupled, preferably connected, to an input of circuit 204. The output of circuit 206 delivers a signal indicating whether the value of voltage Vbat is within the range.

Preferably, if the signal supplied to circuit 204 by circuit 206 indicates that voltage Vbat is in the range, the control signal d generated by circuit 204 indicates to circuit 307 that thresholds V1 and V2 should each take a predetermined value, whatever the value of current IL. For example, the predetermined values, at a given cycle, are the values that the thresholds had at the previous cycle. According to another example, the predetermined value is a fixed value, for example, the lowest possible value of DV.

Figure 6:
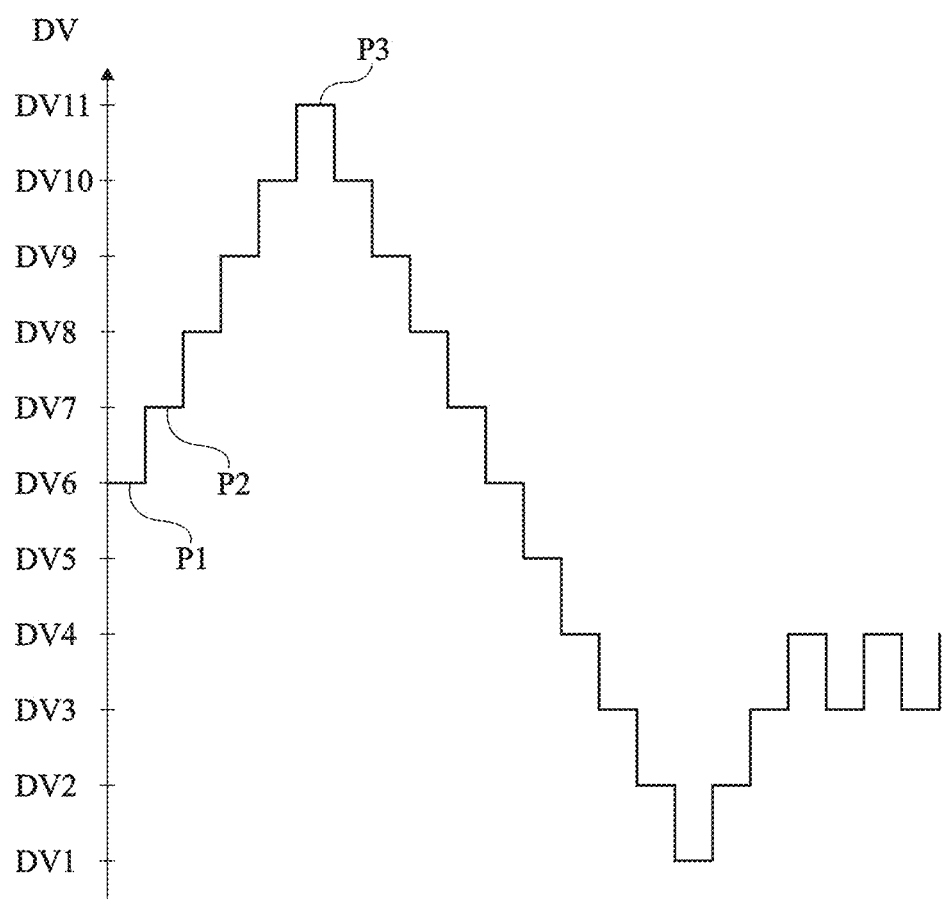
FIG. 6 shows an example of variation of variable DV.

FIG. 6 shows an example of variation of variable DV. In the example of FIG. 5, variable DV may take 11 different values DV1, DV2, DV3, DV4, DV5, DV6, DV7, DV8, DV9, DV10, and DV11. Value DV1 for example corresponds to value zero, variable DV then being capable of taking ten values different from zero.

Variable DV successively takes all the possible values until reaching a value DV, and thus threshold values V1 and V2, enabling to have, at the end of the cycle, a current IL substantially equal to zero.

In the example of FIG. 6, during a first cycle, corresponding to a first stage P1, variable DV has value DV6. Thresholds V1 and V2 thus respectively have values Vref−DV6 and Vref+DV6. If current IL is different from zero at the end of the cycle, variable DV takes a next value, preferably separated from DV6 by the value of the constant. In the example of FIG. 6, the next value is value DV7, equal to value DV6 plus the value of the constant. During a second cycle, corresponding to a second stage P2, variable DV thus has value DV7.

At each cycle, if the current at the end of the cycle is different from zero, that is, in practice, greater or smaller than zero, value DV is modified, which corresponds to another stage. According to an embodiment, if the current is smaller than zero, value DV is modified in a first direction, and if the current is greater than zero, value DV is modified in a second direction, opposite to the first direction. For example, if the current is smaller than zero, value DV takes a smaller value, which corresponds to a lower stage, and if the current is greater than zero, value DV takes a greater value. If value DV reaches a maximum value, here, DV11, corresponding to a stage P3 or a minimum value, here DV1, the directions of modification of value DV are for example inverted. The minimum value for example corresponds to variable DV equal to zero, that is, to thresholds V1 and V2 equal to Vref.

It is for example considered that the end-of-cycle current is substantially equal to zero when it alternates, from one cycle to the other, between below zero and above zero. This corresponds, for value DV, to an alternation between two values of DV. In FIG. 5, value DV alternates between values DV3 and DV4, indicating that the end-of-cycle current is substantially equal to zero.

As a variant, variable DV may initially be equal to zero, that is, thresholds V1 and V2 may initially be equal to voltage Vref.

Figure 7:
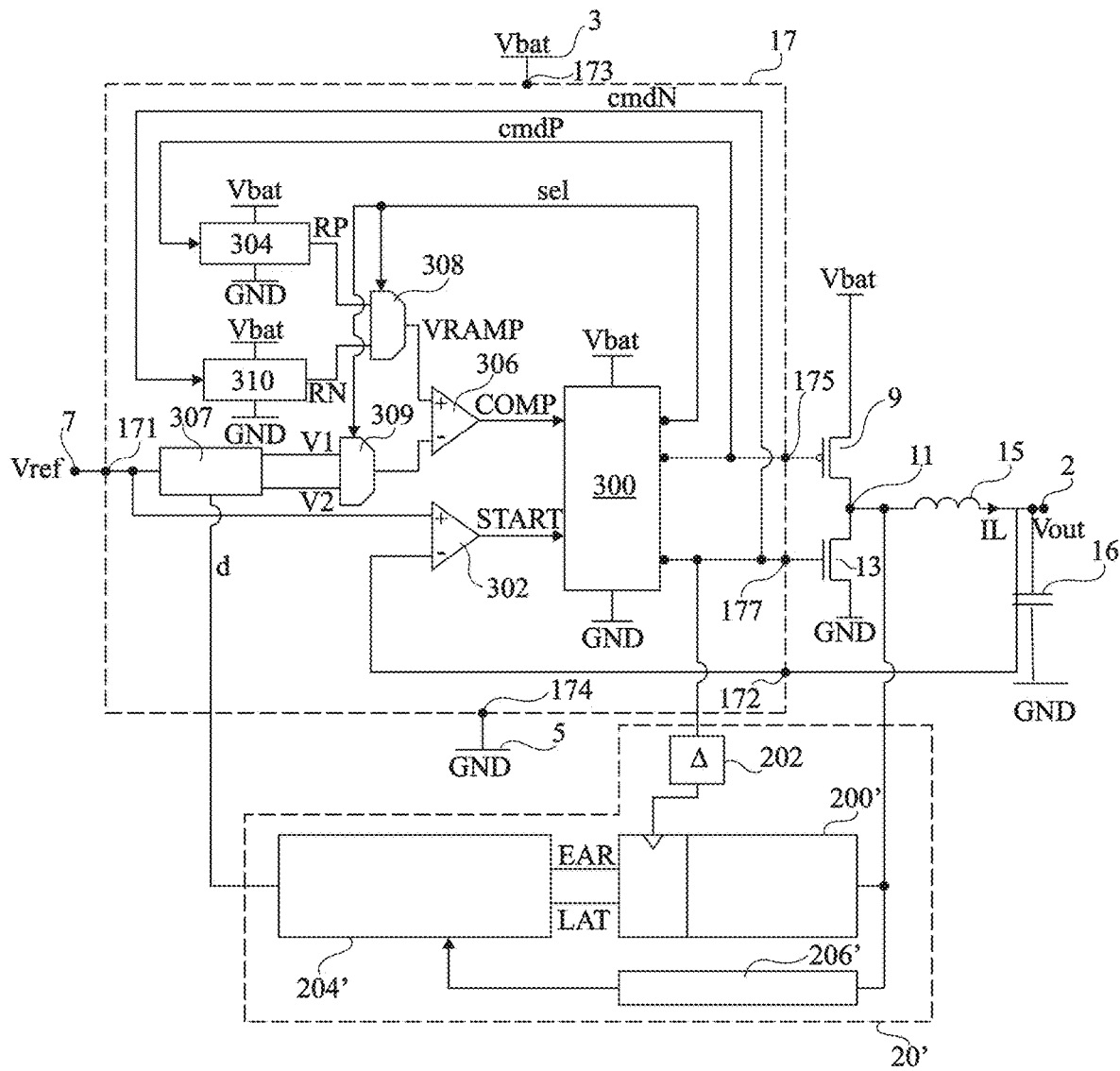
FIG. 7 shows another embodiment of a converter.

FIG. 7 shows another embodiment of a converter. The converter comprises elements identical to the elements of the embodiment of FIG. 4. Only the elements which are different between the embodiments will be described.

The embodiment of FIG. 7 differs from the embodiment of FIG. 4 in that the variation of voltages V1 and V2 during a given cycle is dependent on the value of current IL when signal COMP takes the second value (here, the low value). More particularly, the variation depends on the sign of current IL and on the slopes of current IL during the magnetization, that is, when voltage VRAMP follows the variation of the increasing ramp (RP), and during the demagnetization, that is, when voltage VRAMP follows the variations of the decreasing ramp (RN).

The slope of current IL during the magnetization is equal to (Vbat−Vout)/L. The slope of current IL during the demagnetization is equal to −Vout/L. Thus, when value (Vbat−Vout)/L is greater than value Vout/L, that is, when voltage Vbat is greater than voltage 2*Vout, this means that a given duration has more impact during the magnetization than during the demagnetization. In other words, the increase of current IL during a time period T of the magnetization is greater than the decrease of current IL during a same time period T of the demagnetization.

Similarly, when value (Vbat−Vout)/L is smaller than value Vout/L, that is, when voltage Vbat is greater than value 2*Vout, this means that a given duration has more impact during the demagnetization than during the magnetization. In other words, the increase of current IL during a time period T of the magnetization is smaller than the decrease of current IL during a same time period T of the demagnetization.

A decrease in threshold V1 implies that voltage VRAMP, following the variations of ramp RP, reaches threshold V1 sooner. Current IL thus increases during a shorter time period and reaches a lower value.

An increase in threshold V1 implies that voltage VRAMP, following the variations of ramp RP, reaches threshold V1 later. Current IL thus increases during a longer time period and reaches a higher value.

Similarly, an increase in threshold V2 implies that voltage VRAMP, following the variations of ramp RN, reaches threshold V2 sooner. Current IL thus decreases during a shorter time period and reaches a higher value.

A decrease in threshold V2 implies that voltage VRAMP, following the variations of ramp RN, reaches threshold V2 later. Current IL thus decreases during a longer time period and reaches a lower value.

In the case where voltage V1 is equal to Vref−DV and voltage V2 is equal to Vref+DV, the variations of voltages V1 and V2 are achieved by varying variable DV. Thus, threshold V1 varies by a same value as threshold V2, in reverse fashion. In other words, if threshold V1 increases by a certain value, threshold V2 decreases by this same value, and conversely.

In a first case, it is considered that variable DV is increased between a first cycle and a second cycle following the first cycle, that is, thresholds V1 and V2 are more distant from each other during the second cycle than during the first cycle. Voltage VRAMP reaches threshold V1 faster during the magnetization of the second cycle than during the magnetization of the first cycle and reaches voltage V2 faster during the demagnetization of the second cycle than during the demagnetization of the first cycle. Thus, the value of current IL increases less during the magnetization of the second cycle than during the magnetization of the first cycle and decreases less during the demagnetization of the second cycle than during the demagnetization of the first cycle. Ramps RP and RN having the same slope, the magnetization and the demagnetization are shortened by a same time period Dur between the first and second cycles. Such variations particularly have an impact on the value of current IL at the end of the cycle.

If the slope of the current is greater during the magnetization than during the demagnetization, the difference between the increase of current IL during the magnetization of the first cycle and that during the magnetization of the second cycle is greater than the difference between the decrease of current IL during the demagnetization of the first cycle and that during the demagnetization of the second cycle. Thus, the value of current IL at the end of the second cycle is smaller than the end value of the first cycle, corresponding to a lower value of variable DV.

In other words, if the slope of the current is greater during the magnetization than during the demagnetization, in other words, if value (Vbat−Vout)/L is greater than value Vout/L, and if the value of current IL is greater than 0 at the end of a cycle, circuit 307 is configured to increase variable DV during the next cycle, that is, the distance between voltages V1 and V2 increases.

Similarly, in the first case, if the slope of the current is greater during the demagnetization than during the magnetization, the difference between the increase of current IL during the magnetization of the first cycle and that during the magnetization of the second cycle is smaller than the difference between the decrease of current IL during the demagnetization of the first cycle and that during the demagnetization of the second cycle. Thus, the value of current IL at the end of the second cycle is greater than the end value of the first cycle, corresponding to a smaller value of variable DV.

In other words, if the slope of the current is greater during the demagnetization than during the magnetization, in other words, if value (Vbat−Vout)/L is greater than value Vout/L, and if the value of current IL is smaller than 0 at the end of a cycle, circuit 307 is configured to increase variable DV during the next cycle, that is, the distance between voltages V1 and V2 increases.

In a second case, it is considered that variable DV is decreased between a second cycle following the first cycle, that is, thresholds V1 and V2 are less distant from each other during the second cycle than during the first cycle. Voltage VRAMP reaches threshold V1 slower during the magnetization of the second cycle than during the magnetization of the first cycle and reaches voltage V2 slower during the demagnetization of the second cycle than during the demagnetization of the first cycle. Thus, the value of current IL increases more during the magnetization of the second cycle than during the magnetization of the first cycle and decreases more during the demagnetization of the second cycle than during the demagnetization of the first cycle. Ramps RP and RN having the same slope, the magnetization and the demagnetization are lengthened by a same duration between the first and second cycles. Such variations particularly have an impact on the value of current IL at the end of the cycle.

If the slope of the current is greater during the magnetization than during the demagnetization, the difference between the increase of current IL during the magnetization of the first cycle and that during the magnetization of the second cycle is greater than the difference between the decrease of current IL during the demagnetization of the first cycle and that during the demagnetization of the second cycle. Thus, the value of current IL at the end of the second cycle is greater than the value at the end of the first cycle, corresponding to a smaller value of variable DV.

In other words, if the slope of the current is greater during the magnetization than during the demagnetization, in other words, if value (Vbat−Vout)/L is greater than value Vout/L, and if the value of current IL is smaller than 0 at the end of a cycle, circuit 307 is configured to decrease variable DV during the next cycle, that is, the distance between voltages V1 and V2 decreases.

Similarly, in the second case, if the slope of the current is greater during the demagnetization than during the magnetization, the difference between the increase of current IL during the magnetization of the first cycle and that during the magnetization of the second cycle is smaller than the difference between the decrease of current IL during the demagnetization of the first cycle and that during the demagnetization of the second cycle. Thus, the value of current IL at the end of the second cycle is smaller than the value at the end of the first cycle, corresponding to a lower value of variable DV.

In other words, if the slope of the current is greater during the magnetization than during the demagnetization, in other words, if value (Vbat−Vout)/L is greater than value Vout/L, and if the value of current IL is smaller than 0 at the end of a cycle, circuit 307 is configured to decrease variable DV during the next cycle, that is, the distance between voltages V1 and V2 decreases.

The circuit 20 of FIG. 4 is replaced, in the embodiment of FIG. 7, with a circuit 20' configured to supply signal d for controlling circuit 307. Circuit 307 adjusts thresholds V1 and V2 according to signal d as previously described in relation with FIG. 7. Thus, signal d is generated by circuit 20' to cause the increase of the value of DV or the decrease of the value of DV according to the value of current IL at the end of the cycle and according to the comparison of the slopes of current IL during the magnetization and the demagnetization.

Circuit 20 comprises a circuit 200' configured to determine whether current IL is smaller than, greater than, or equal to value zero. Like the circuit 200 of FIG. 4, circuit 200' comprises a first input coupled, preferably connected, to node 11 delivering voltage Vout and a second input enabling to determine the end of the operating cycle. The second input is for example, as in the embodiment of FIG. 4, coupled to node 177 via circuit 202.

In the example of FIG. 7, circuit 200' comprises two outputs. An output delivers a signal EAR indicating that current IL at the end of the last cycle is positive. For example, signal EAR takes a first value to indicate that the current was positive at the end of the cycle and a second value to indicate that it was not positive at the end of the cycle. Another output delivers a signal LAT indicating that current IL at the last cycle is negative. For example, signal LAT takes a first value to indicate that the current was negative at the end of the cycle and a second value to indicate that it was not negative at the end of the cycle. If signals EAR and LAT keep the second value, this means that current IL was, at the end of the cycle, equal to zero.

Circuit 20' further comprises a circuit 206' configured to compare voltage Vbat with twice voltage Vout. The result of this comparison corresponds to the result of the comparison between value Vbat−Vout and value Vout, in other words, to the result of the comparison between value (Vin−Vout)/L and Vout/L. In other words, circuit 206 is configured to compare the slope of current IL during the magnetization and during the demagnetization.

Circuit 206' is coupled, preferably connected, to the input of node 11 delivering voltage Vout. Circuit 206' is further coupled, preferably connected, to the input of rail 3. The link between circuit 206' and rail 3 is not shown in FIG. 7.

Circuit 206' delivers, like the circuit 206 of FIG. 4, the information according to which values Vbat and 2*Vout are sufficiently close, for example, equal to each other to within 200 mV.

Circuit 206' is also configured to deliver the information that the slope of current IL during the magnetization is greater or smaller than the slope of current IL during the demagnetization. In other words, circuit 206' is configured to deliver the information that Vbat is smaller or greater than 2*Vout.

Circuit 20' further comprises a circuit 204' configured to generate signal d. Circuit 204' is coupled, preferably connected, at its input to the outputs of circuits 200' and 206'. Circuit 204' thus generates signal d, as previously described, according to:

the information generated by circuit 200' indicating the sign of current IL at the end of the cycle;

the information generated by circuit 206' indicating whether the slope of current IL during the magnetization is greater or smaller than the slope of current IL during the demagnetization; and the information generated by circuit 206' indicating whether the values of Vbat and of 2*Vout are sufficiently close, for example, equal to each other to within 200 mV.

In other words, according to an embodiment, if:

voltage Vbat is in the previously-described range of values, for example, between 2*Vout−200 mV and 2*Vout+200 mV, thresholds V1 and V2 are set to a predetermined value independent from the values of the thresholds at the previous cycle, or in another example, keep the values of the previous cycle;

voltage Vbat is in the previously-described range of values, for example, between 2*Vout−200 mV and 2*Vout+200 mV, and if voltage Vbat is greater than voltage 2*Vout, in other words, in the present example, if voltage Vbat is greater than 2*Vout+200 mV:

a) if current IL is smaller than zero, value DV is decreased, in other words, threshold V1 is increased and threshold V2 is decreased; and b) if current IL is greater than zero, value DV is increased, in other words, threshold V1 is decreased and threshold V2 is increased;

voltage Vbat is in the previously-described range of values, for example, between 2*Vout−200 mV and 2*Vout+200 mV, and if voltage Vbat is smaller than voltage 2*Vout, in other words, in the present example, if voltage Vbat is smaller than 2*Vout−200 mV:

a) if current IL is greater than zero, value DV is decreased, in other words, threshold V1 is increased and threshold V2 is decreased; and b) if current IL is smaller than zero, value DV is increased, in other words, threshold V1 is decreased and threshold V2 is increased.

As a variant, thresholds V1 and V2 may be modified independently from each other. In this case, if the current IL at the end of a cycle is smaller than zero, threshold V1 is decreased or threshold V2 is increased at the next cycle. If current IL at the end of a cycle is smaller than zero, threshold V1 is increased or threshold V2 is decreased at the next cycle.

An advantage of the embodiment of FIG. 7 is that it enables to converge faster towards a value DV enabling to have a null current IL at the end of the cycle.

Figure 8:
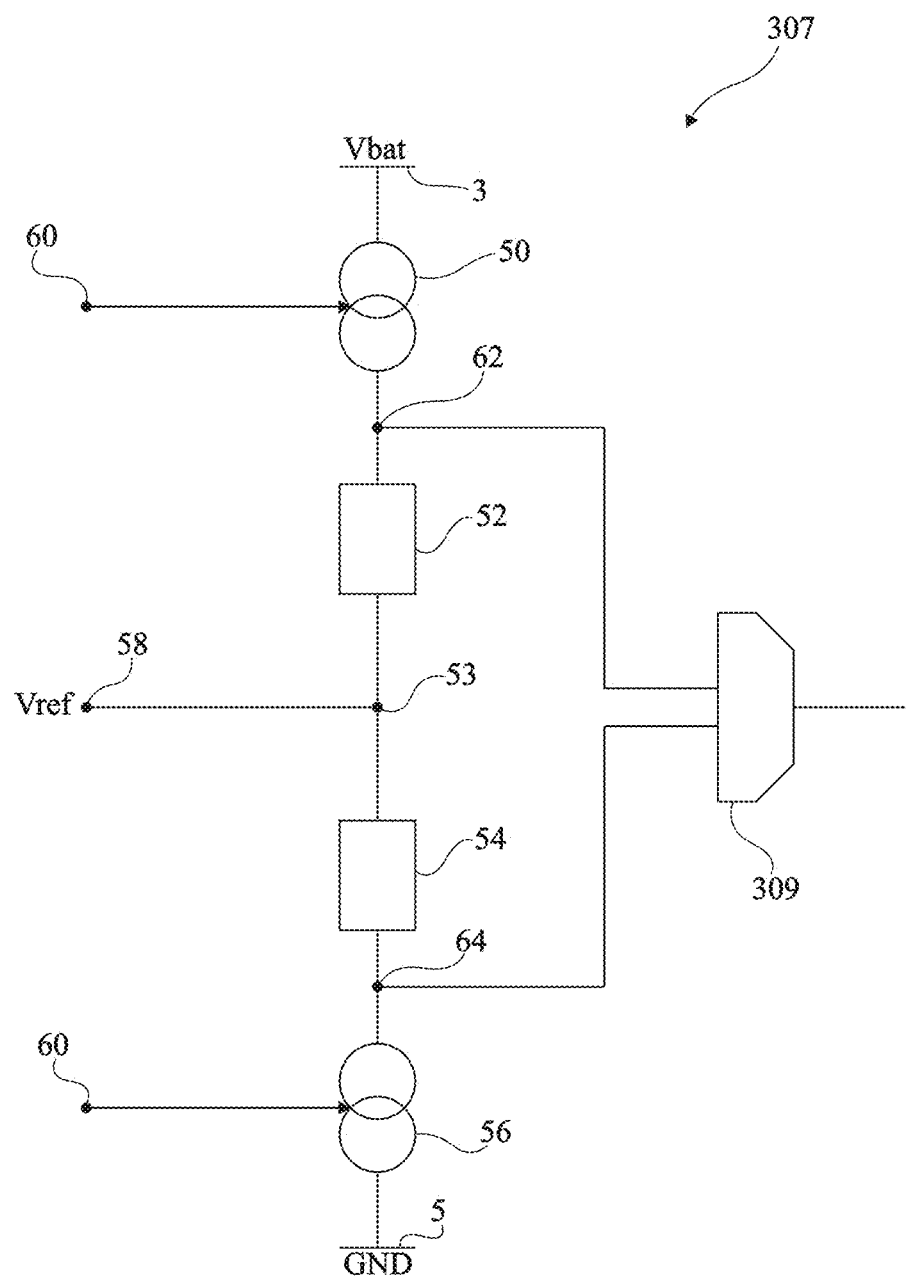
FIG. 8 shows an example of implementation of a portion of the converter of FIG. 4 or of FIG. 7.

FIG. 8 shows an example of implementation of a portion of the converter of FIG. 4 or of FIG. 7. More particularly, FIG. 8 shows an example of implementation of circuit 307 and of circuit 309.

Circuit 307 comprises, series-coupled in this order between node 3 and node 5, a current source 50, resistor 52, a resistor 54, and a current source 56. Thus, source 50 is coupled, preferably connected, between node 3 and a terminal of resistor 52. Thus, source 50 and resistor 52 are coupled, preferably connected, to a node 62. The other terminal of resistor 52 is coupled, preferably connected, to a central node 53. A terminal of resistor 54 is coupled, preferably connected, to central node 53. The other terminal of the resistor is coupled, preferably connected, to a terminal of current source 56. Thus, source 56 and resistor 54 are coupled, preferably connected, to a node 64. The other terminal of current source 56 is coupled, preferably connected, to node 5.

Circuit 307 receives, on an input 58, voltage Vref. Circuit 307 further receives, on an input 60 represented by two nodes in FIG. 8, signal d.

Node 62, between source 50 and resistor 52, forms an output of circuit 307 and is coupled, preferably connected, to an input of selection circuit 309. The voltage on node 62 is equal to voltage Vref+DV, that is, voltage V2.

Similarly, node 64, between source 56 and resistor 54, forms an output of circuit 307 and is coupled, preferably connected, to an input of selection circuit 309. The voltage on node 64 is equal to voltage Vref−DV, that is, voltage V1.

Current sources 50 and 56 are controlled by signal d. Signals d are thus generated to configure the sources and adjust the voltages on nodes 62 and 64.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereinabove.

What is claimed is:

1. A voltage converter comprising:
   a first transistor connected between a first node of the converter and a second node configured to receive a power supply voltage;
   a second transistor connected between the first node and a third node configured to receive a reference potential;
   a first circuit configured to control the first and second transistors; and
   a comparator coupled to the first circuit and configured to compare a first voltage with a threshold, the first voltage being equal, during a first period, to a first increasing ramp and, during a second period, to a second decreasing ramp, the threshold having a first value during the first period and a second value during the second period, the first and second values being variable.

2. The converter according to claim 1, further comprising a second circuit configured to generate the threshold.

3. The converter according to claim 2, wherein:
   the converter comprises a third circuit configured to compare a value of a current in the first node with value zero; and
   the second circuit is configured to modify the value of the threshold during an operating cycle if the value of the current in the first node at an end of a previous cycle is different from zero.

4. The converter according to claim 3, wherein:
   the converter further comprises a fourth circuit configured to determine whether the power supply voltage is within a range from a value of the voltage on the first node minus 200 mV to the value of the voltage on the first node plus 200 mV; and
   the second circuit is configured, in a case where the power supply voltage is within the range during a cycle, to keep the first and second values of the threshold for the next cycle or so that the first and second values of the threshold have, during the next cycle, a predetermined value.

5. The converter according to claim 3, further comprising a fifth circuit configured to determine whether the value of the current in the first node is smaller or greater than zero.

6. The converter according to claim 5, further comprising a sixth circuit configured to determine whether a slope of the current in the first node during the first period of a cycle is greater or smaller than the slope during the second period of a cycle.

7. The converter according to claim 6, wherein the second circuit is configured to vary the first and second values of the threshold so that:
   a) if the slope of the current in the first node during the first period is greater than the slope of the current in the first node during the second period and if the current in the first node is smaller than zero, a distance between the first and second values of the threshold is decreased;
   b) if the slope of the current in the first node during the first period is greater than the slope of the current in the first node during the second period and if the current in the first node is greater than zero, the distance between the first and second values of the threshold is increased;
   c) if the slope of the current in the first node during the first period is smaller than the slope of the current in the first node during the second period and if the current in the first node is smaller than zero, the distance between the first and second values of the threshold is increased; and
   d) if the slope of the current in the first node during the first period is smaller than the slope of the current in the first node during the second period and if the current in the first node is greater than zero, the distance between the first and second values of the threshold is decreased.

8. The converter according to claim 7, wherein the first value of the threshold is equal to a reference voltage plus a third value, and the second value of the threshold is equal to the reference voltage minus the third value, the third value being variable, and wherein, in a) and d) the third value is increased, and in b) and c) the third value is decreased.

9. The converter according to claim 3, wherein the third circuit, configured to compare the current in the first node with zero, comprises an input coupled to the first node and an input coupled to a node applying a control voltage to the second transistor.

10. The converter according to claim 9, wherein the third circuit is coupled to the node applying the control voltage by a circuit applying a delay to a control signal.

11. The converter according to claim 1, wherein the first value of the threshold is equal to a reference voltage plus a third value, and the second value of the threshold is equal to the reference voltage minus the third value, the third value being variable.

12. The converter according to claim 11, wherein the third value varies between a number of predetermined values.

13. The converter according to claim 12, wherein the predetermined values of the third value are successively separated by a same fourth constant value.

14. A method of operating a voltage converter, the voltage converter comprising a first transistor connected between a first node of the converter and a second node configured to receive a power supply voltage, a second transistor connected between the first node and a third node configured to receive a reference potential, and a first circuit configured to control the first and second transistors, the method comprising, during each operating cycle:
   comparing, by a comparator during a first period, a first voltage with a threshold, the first voltage being equal, during the first period, to a first increasing ramp, the threshold having, during the first period, a first value; and
   comparing, by the comparator during a second period, the first voltage with the threshold, the first voltage being equal, during the second period, to a second decreasing ramp, the threshold having, during the second period, a second value, the first and second values of the threshold being variable.

15. The method according to claim 14, further comprising generating, by a second circuit, the threshold.

16. The method according to claim 15, further comprising:
comparing, by a third circuit, a value of a current in the first node with value zero; and
modifying, by the second circuit, the value of the threshold during an operating cycle in response to the value of the current in the first node at an end of a previous cycle is different from zero.

17. The method according to claim 16, wherein:
determining, by a fourth circuit, whether the power supply voltage is within a range from a value of the voltage on the first node minus 200 mV to the value of the voltage on the first node plus 200 mV; and
in response to the power supply voltage being within the range during a cycle, keeping, by the second circuit, the first and second values of the threshold for the next cycle, or using, by the second circuit, a predetermined value for the first and second values of the threshold during the next cycle.

18. The method according to claim 16, further comprising determining, by a fifth circuit, whether the value of the current in the first node is smaller or greater than zero.

19. The method according to claim 18, further comprising determining, by a sixth circuit, whether a slope of the current in the first node during the first period of a cycle is greater or smaller than the slope during the second period of a cycle.

20. The method according to claim 19, further comprising varying, by the second circuit, the first and second values of the threshold so that a distance between the first and second values of the threshold is decreased in response to the slope of the current in the first node during the first period being greater than the slope of the current in the first node during the second period, and the current in the first node being smaller than zero.

21. The method according to claim 19, further comprising varying, by the second circuit, the first and second values of the threshold so that a distance between the first and second values of the threshold is increased in response to the slope of the current in the first node during the first period being greater than the slope of the current in the first node during the second period, and the current in the first node being greater than zero.

22. The method according to claim 19, further comprising varying, by the second circuit, the first and second values of the threshold so that a distance between the first and second values of the threshold is increased in response to the slope of the current in the first node during the first period being smaller than the slope of the current in the first node during the second period, and the current in the first node being smaller than zero.

23. The method according to claim 19, further comprising varying, by the second circuit, the first and second values of the threshold so that a distance between the first and second values of the threshold is decreased in response to the slope of the current in the first node during the first period being smaller than the slope of the current in the first node during the second period, and the current in the first node being greater than zero.

24. The method according to claim 14, wherein the first value of the threshold is equal to a reference voltage plus a third value, and the second value of the threshold is equal to the reference voltage minus the third value, the third value being variable.

25. The method according to claim 24, wherein the third value varies between a number of predetermined values.

26. The method according to claim 25, wherein the predetermined values of the third value are successively separated by a same fourth constant value.

* * * * *